United States Patent [19]

Backman, Jr. et al.

[11] 4,050,057
[45] Sept. 20, 1977

[54] DATA SAMPLE RECORDING SYSTEM

[75] Inventors: William R. Backman, Jr., Portsmouth; Mark A. Chramiec, Newport, both of R.I.

[73] Assignee: Raytheon Company, Lexington, Mass.

[21] Appl. No.: 673,229

[22] Filed: Apr. 2, 1976

[51] Int. Cl.$^2$ .............................................. G01S 7/60
[52] U.S. Cl. .................................. 340/3 F; 346/33 EC
[58] Field of Search ............. 340/3 F, 1 C; 343/5 PC; 346/33 EC

[56] References Cited

U.S. PATENT DOCUMENTS

| | | | |
|---|---|---|---|
| 3,363,226 | 1/1968 | Murphree | 340/3 F |
| 3,683,403 | 8/1972 | Okino | 340/3 F |
| 3,719,920 | 3/1973 | Grada et al. | 340/3 R |
| 3,735,334 | 5/1973 | Ahrens et al. | 343/5 PC |
| 3,852,705 | 12/1974 | Backman, Jr. et al. | 340/3 F |

Primary Examiner—Richard A. Farley
Attorney, Agent, or Firm—David M. Warren; Joseph D. Pannone; Milton D. Bartlett

[57] ABSTRACT

A data sample recording system having a memory for storing a predetermined number of data samples accumulated over various intervals of time. Each interval of time is divided into a predetermined number of subintervals, there being an electrical circuit for detecting the peak value of data occurring in each of the subintervals. The occurrences of the subintervals are synchronized with a periodic passing of a stylus across a recording medium in a recorder. The predetermined number of data samples is equal to the number of resolution elements of a line of data on the recording medium, stored data being fed out to the recorder in synchronism with the stylus movement to provide a display of data having a predetermined number of resolution elements of display independent of the length of the interval of time.

7 Claims, 3 Drawing Figures

DATA SAMPLE RECORDING SYSTEM

BACKGROUND OF THE INVENTION

This invention relates to data recording equipment, and more particularly to a system adapted for a series of measurements, such as sonar depth sounding, wherein a fixed number of output samples of data is provided for an input data interval of varying duration.

A typical situation wherein data is to be accumulated during an interval of varying duration is that of the sonar sounding situation wherein the data input interval is the length of time in which a sonar signal travels from a transmitting transducer to a reflecting surface, such as the ocean bottom, and returns to a receiving transducer. Typically, such a sonar system is carried by a ship sailing through water of varying depth with the result that the data to be accumulated occurs during an interval of time which varies in accordance with the depth of the ocean. On the other hand, the data output of a sonar system is typically portrayed on a recorder having a recording medium of fixed dimensions upon which the data is displayed.

A problem arises in that such recorders typically utilize a stylus for imprinting marks on the recording medium, the marks representing points of reflection of sonar signals in the ocean. If the stylus transport mechanism is set for a specific speed of stylus movement across the recording medium, then, as the depth increases, there may be insufficient space on the recording medium to imprint all the marks while, as the depth decreases, an increasingly large portion of the recording medium is not utilized at all for the imprinting of marks. One solution to this problem has been the use of selectible gear ratios in a geared transmission of the stylus transport. However, such gearing tends to introduce noise which is particularly dangerous in an environment wherein enemy submarines may be listening for such noise. Also, complex geared transmissions are more prone to wear than a similar stylus transport having but one speed.

SUMMARY OF THE INVENTION

The aforementioned problem of the prior art is overcome and other advantages are provided by a data sample recording system which, in accordance with the invention, provides for the counting of a predetermined number of divisions of an interval during which data is to be accumulated. During each of these divisions or subintervals, a sampling circuit provides a measure of a signal characteristic, such as the peak amplitude of a sonar echo, occurring therein. A sample of the peak signal in each subinterval is obtained via an intermediary storage facility which permits the data samples to be read out of the storage facility at a rate different from that at which they were accumulated.

More specifically, in a preferred embodiment of the invention, the data sample recording system employs a recorder having a stylus which periodically passes over a recording medium for printing data thereon, the periodicity of the stylus motion serving as a time base for designating the predetermined number of subintervals during which the data samples are to be obtained. The number of subintervals is equal to the number of resolution elements in a line of data displayed on the recording medium. The data samples are counted out of the storage facility in synchronism with the stylus movement so that each data sample is printed in its corresponding resolution element of the data displayed on the recording medium. The number of resolution elements in a line of displayed data is invariant with respect to the duration of the interval during which data is accumulated.

BRIEF DESCRIPTION OF THE DRAWINGS

The aforementioned aspects and other features of the invention are explained in the following description taken in connection with the accompanying drawings.

DESCRIPTION OF THE PREFERRED EMBODIMENT

Figure 1:
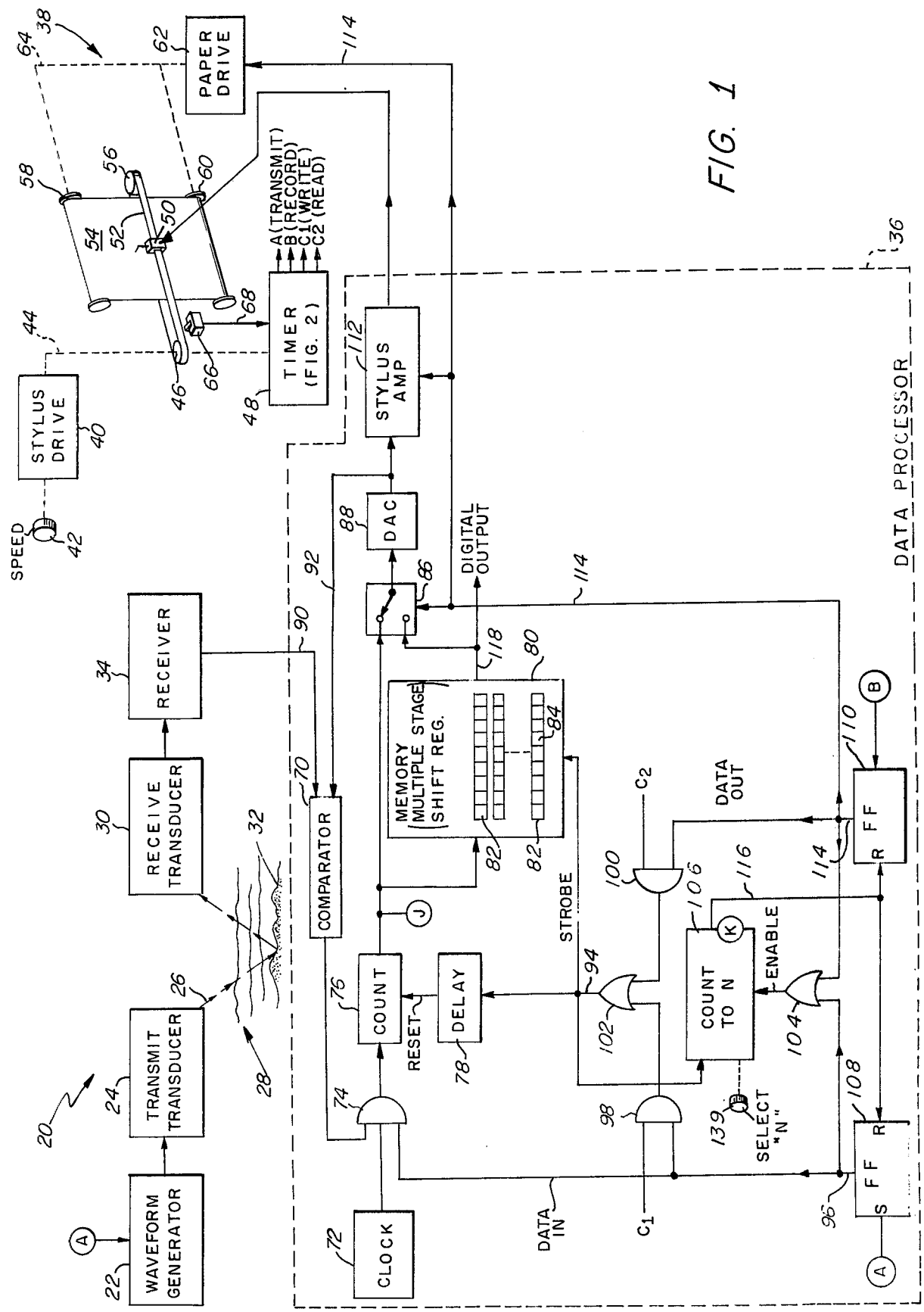
FIG. 1 is a block diagram, portions of which are stylized, showing a sonar depth sounding system incorporating the invention.

Referring now to FIG. 1 there is seen a sonar depth sounding system 20 incorporating a signal waveform generator 22, a transmitting transducer 24 transmitting sound waves represented by the arrows 26 into the ocean 28, a receiving transducer 30 responsive to sound waves reflected from the bottom 32 of the ocean 28, a receiver 34, a data processor 36 which samples and stores data, and a recorder 38. The recorder 38 is seen to comprise a stylus drive unit 40 including a knob 42 for adjusting the speed thereof, the stylus drive unit 40 being mechanically coupled via line 44 to a pulley 46 and a timer 48. A stylus 50 is carried by a belt 52 across a roll of paper 54 which serves as the recording medium. The belt 52 is seen to pass around the pulley 46 and a second pulley 56, the belt 52 being driven by the pulley 46 in response to the rotation imparted thereto by the stylus drive unit 40. The paper 54 is rolled about two rollers 58 and 60 by a paper drive unit 62 which is mechanically coupled thereto via line 64. A switch 66 positioned adjacent the belt 52 signals the timer 48 via line 68 whenever the stylus 50 contacts the switch 66 during its successive passes across the paper 54.

The timer 48 provides four output signals identified by the legends A, B, C1 and C2, these legends also serving to identify the terminals of the timer 48. The A signal is a pulse waveform, the leading edge thereof serving to trigger the generator 22 to produce a signal which is transmitted into the ocean 28 via the transducer 24. The B signal is a pulse signal, the leading edge thereof signaling the time when data is to be read out of the data processor 36 to be displayed by the recorder 38. The signals C1 and C2 are clock pulse timing signals utilized by the data processor 36 respectively for writing data into memory therein and for reading that data out of the memory.

In accordance with the invention, the data processor 36 comprises a comparator 70, a clock 72, an AND gate 74, a counter 76, a delay unit 78, a memory 80 in the form of a multiple stage shift register wherein a plurality of shift registers 82 are arranged in parallel with the corresponding cells 84 thereof being used for storing individual digits of a digital number provided by the counter 76, a switch 86, and a digital-to-analog converter hereinafter referred to as DAC 88. An output terminal of the receiver 34 is coupled to an input terminal of the comparator 70 via line 90 and the DAC 88 is coupled to a second input terminal of the comparator 70 via line 92. The memory 80 is strobed by a signal on line 94, this signal also being coupled via the delay unit 78 for resetting the counter 76 to zero.

Figure 3:
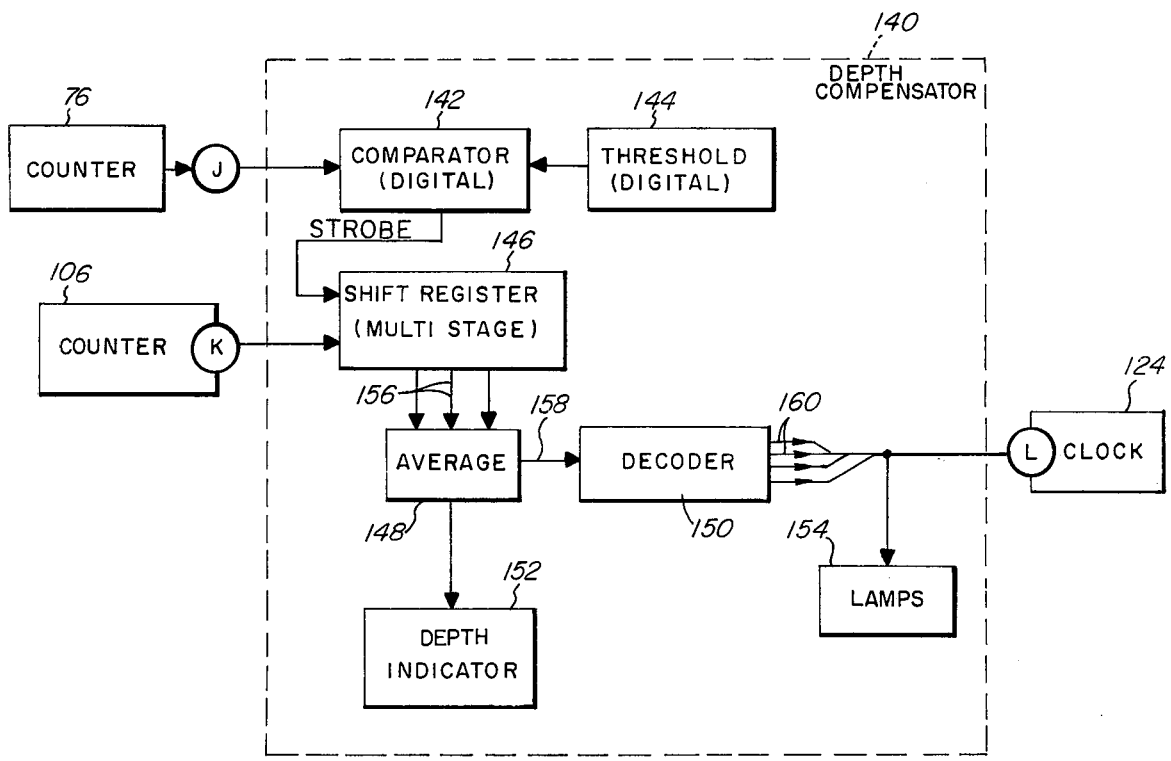
FIG. 3 is a block diagram of a further feature of the invention providing differing intervals of time during which data is sampled.

In operation, therefore, the comparator 70, the AND gate 74, the counter 76 and the DAC 88 function to provide the peak value of a signal occurring during a predetermined interval of time, their functioning being analogous to that taught with reference to the corresponding elements of FIG. 3 in the U.S. Pat. No. 3,839,680 which issued in the name of W. R. Backman, Jr. on Oct. 1, 1974.

During such times as an enabling signal on line 96 is high, the signal having a relatively high voltage representing a logic state of 1, clock pulses from the clock 72 are passed by the AND gate 74 in response to a high signal from the comparator 70. The term "high" utilized in describing the signals refers to a relatively high voltage representing a logic state of 1 while the term "low" utilized in describing these signals refers to a relatively low voltage representing a logic state of 0. The clock pulses passed by the AND gate 74 are counted by the counter 76, the digital number appearing at the output of the counter 76 representing the count thereof being coupled via the switch 86 to the DAC 88. The DAC 88 converts this digital number to an analog voltage which is coupled via line 92 back to the comparator 70. When the amplitude of the signal on line 92 is less than the amplitude of the signal on line 90, the output of the comparator 70 is high. As the count of the counter 76 rises, the amplitude of the signal on line 92 increases to a point at which it equals the amplitude of the signal on line 90. When the point of equality is reached, the output of the comparator 70 goes low thereby inhibiting the coupling of further clock pulses from the clock 72 to the counter 76. The count of the counter 76 is retained during such times as the signal on line 90 maintains its amplitude or reduces its amplitude. However, in the event that the signal on line 90 should again increase in amplitude, then clock pulses from the clock 72 are again passed via the AND gate 74 to the counter 76, the count thereof increasing until an equality is again reached between the amplitudes of the signals on lines 90 and 92. This procedure continues throughout an interval of time during which the signal on line 90 is to be observed, and, at the conclusion of that interval, the signal on line 94 strobes the shift registers 82 of the memory 80 to store the digital number of the counter 76. This digital number has a magnitude representative of the magnitude of the signal sample to be stored during the sampling interval. A moment after the strobing of the memory 80, as determined by the delay of the delay unit 78, the strobe signal of line 94 reaches the counter 76 and resets the count thereof to zero. Thereafter, the aforementioned procedure is resumed for the next sampling interval.

The data processor 36 further comprises AND gates 98 and 100, OR gates 102 and 104, a counter 106, and flip-flops 108 and 110 for enabling the flow of data into and out of the memory 80. There is also provided an amplifier 112 coupled between the DAC 88 and the stylus 50 for amplifying the output analog signals of the DAC 88 to a suitable level for energizing the stylus 50 to inscribe data upon the paper 54.

Each of the flip-flops 108 and 110 is the set-reset type of flip-flop. The flip-flop 108 is set by the leading edge of the transmit signal at terminal A of the timer 88, and in the set condition applies a high signal on line 96. The flip-flop 110 is set by the record signal from terminal B of the timer 48, and in the set condition applies a high signal on line 114. Each of the flip-flops 108 and 110 is reset by a signal on line 116 provided by the counter 106. During the reset condition, the flip-flops 108 and 110 provide low signals on the lines, respectively, 96 and 114.

The counter 106 counts either the clock pulses of the write signal from terminal C1 of the timer 48 or the clock pulses of the read signal from terminal C2 of the timer 48. The C1 pulses are coupled via the AND gate 98 and the OR gate 102, and then via line 94 to the clock input terminal of the counter 106. The C2 pulses are coupled via the AND gate 100, the OR gate 102 and the line 94 to the counter 106. As will become apparent from the ensuing description of the timer 48, only one of the flip-flops 108 and 110 is in a set condition at any one time. Thus, both lines 96 and 114, coupled respectively to the output terminals of the flip-flops 108 and 110, may have low signals or line 96 may have a high signal, or line 114 may have a high signal. However, both lines 96 and 114 do not simultaneously have high signals. Accordingly, when the line 96 has a high signal, the C1 pulses are coupled via the AND gate 98 to the counter 106, and when the line 114 has a high signal, the C2 pulses are coupled by the AND gate 100 to the counter 106. As was noted hereinabove, the pulses on line 94 also serve to strobe the memory 80 and reset the counter 76.

The signal on line 96 is also coupled via the OR gate 104 to a terminal of the counter 106 for enabling the counter to count the clock pulse signals on line 94. The counter 106 is enabled when a high signal is present on line 96. Similarly, the counter 106 is enabled when a high signal is present on line 114, the high signal on line 114 also being coupled to the counter 106 via the OR gate 104. It is also noted that the signal on line 114 is further coupled to a control terminal of the switch 86, to a gating terminal of the amplifier 112, and to a terminal of the paper drive unit 62. With respect to the switch 86, signals are coupled from the counter 76 to the DAC 88, as shown in the figure, when the signal on line 114 is low. When the signal on line 114 is high, the switch 86 is operated to its alternate position for coupling signals from the memory 80 to the DAC 88. The amplifier 112 is gated on by a high signal on line 114, there being no coupling of signals from the DAC 88 to the stylus 50 by the amplifier 112 when the signal on line 114 is low. The paper drive unit 62 rotates the rollers 58 and 60 when the signal on line 114 is high, the rollers 58 and 60 being stationary when the signal on line 114 is low.

In operation, therefore, in response to the transmit signal at terminal A, the flip-flop 108 enables the AND gate 98 to pass the C1 pulses and also enables the AND gate 74 to pass clock pulses from the clock 72. As was explained hereinabove, in response to each C1 clock pulse appearing on line 94, one sample of data is stored in the memory 80. The memory 80 has a storage capacity of N samples of data, each of the shift registers 82 having a corresponding number of N cells 84 for the individual digits of each digital number representing the amplitude of the data sample. The counter 106 counts each of the C1 pulses and, when a count of N is attained, the counter 106 provides a pulse on line 116 and then resets itself to zero, the pulse on line 116 serving to reset the flip-flops 108 and 110. Upon the resetting of the flip-flop 108, the AND gates 98 and 74 are disabled so that no further input data samples are presented to the memory 80, the flow of clock pulses from the clock 72 to the counter 76 being discontinued by the disabling of the AND gate 74, and the flow of C1 pulses to the counter 106 being discontinued by the disabling of the AND gate 98.

Upon the setting of the flip-flop 110 by the record signal at terminal B, the AND gate 100 passes C2 pulses to the counter 106 and the memory 80. It is noted that the C2 pulses are also coupled via line 94 and the delay unit 78 to the counter 76 but, since the counter 76 has been reset to zero and since there are no further pulses from the clock 72 being coupled thereto, the application of the C2 pulses to the counter 76 have no effect. Upon each occurrence of a C2 pulse, the shift registers 82 of the memory 80 are strobed to move the data samples toward the right to exit on line 118. Line 118 provides a digital output which permits the data processor 36 to be coupled to a computer or other digital system for further storage and/or processing of the data samples. In view of the high signal present on line 114, the digital signals on line 118 are also coupled via the switch 86 to the DAC 88 which converts these digital signals to analog signals, the analog signals then being coupled via the amplifier 112 to be imprinted on the paper 54 of the recorder 38. Thus, during the time when the flip-flop 110 is in a set condition, the data samples stored in the memory 88 are sequentially shifted toward the output terminal of the memory 80 whereupon the sequentially occurring data samples are inscribed upon the paper 54 of the recorder 38.

It is noted that as the stored data samples are sequentially shifted to the output terminal of the memory 80, the input terminal of the memory 80 is still coupled to the counter 76 so that a succession of zeros are entered into the cells 84 of the shift registers 82 in response to each strobing of the memory 80 by a C2 pulse. The counter 106 counts each C2 pulse appearing on line 94 and, upon the occurrence of N of the C2 pulses, the counter 106 provides the aforementioned pulse on line 116 for resetting the flip-flops 108 and 110 and, thereafter, resets itself to a count of zero. Upon the resetting of the flip-flop 110, the AND gate 100 is disabled so that no more C2 pulses are passed therethrough for strobing the memory 80. In addition, the switch 86 reverts to the position shown in the figure for coupling the counter 76 to the DAC 88. Also, the amplifier 112 is disabled and the paper drive unit 62 is disabled upon the resetting of the flip-flop 110. With the counting of the N pulses of the C2 signal, the memory 80 has become cleared, there being a 0 stored in each cell 84 thereof. Thus, the memory 80 is now ready to accumulate a new series of data samples, that series of data samples to begin with the next sonar ping along the arrow 26, which ping is initiated by the transmit signal at terminal A at the generator 22, the transmit signal also being applied at terminal A of the flip-flop 108.

Figure 2:
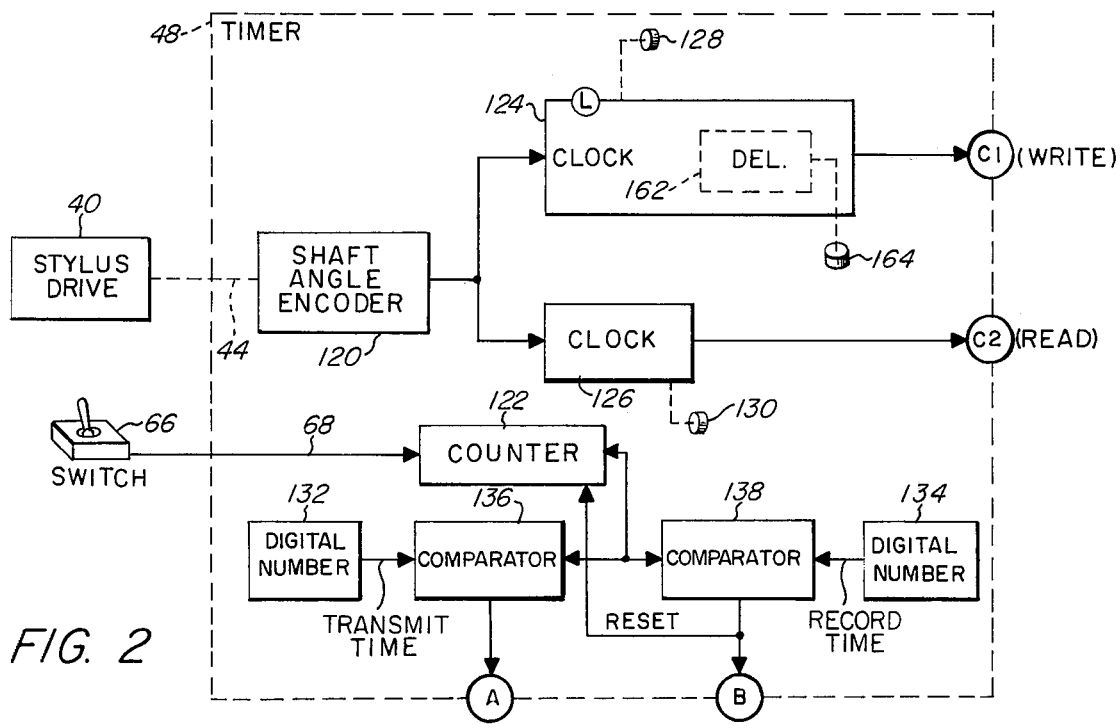
FIG. 2 is a block diagram of a timer of FIG. 1.

Referring now to FIG. 2, there is seen a block diagram of the timer 48 which comprises a shaft angle encoder 120 mechanically coupled via line 44 to the stylus drive unit 40 of FIG. 1, a counter 122 electrically coupled via line 68 to the switch 66 of FIG. 1, clocks 124 and 126 having knobs 128 and 130, respectively, for adjusting the speeds of the clocks 124 and 126, two manually operated sources 132 and 134 of digital numbers, and two comparators 136 and 138.

Each of the clocks 124 and 126 provides trains of clock pulse signals, the repetition frequencies thereof being dependent on the settings of the knobs 128 and 130, the pulse train signal of the clock 124 appearing at terminal C1 and the pulse train signal of the clock 126 appearing at terminal C2. The speed, or pulse repetition frequency, of the clock 124 as selected by the knob 128 is locked to the speed of the stylus drive unit 40 by electrical pulses applied to the clock 124 by the encoder 120. Similarly, the speed of the clock 126 is locked to the speed of the stylus drive unit 40 by electrical pulses from the encoder 120. In this way the repetition frequency of the C2 pulses is proportional to the speed of movement of the stylus 50 of FIG. 1 across the paper 54. Thus, in the event that the drive unit 40 slows down the speed of the stylus 50, then the repetition frequency of the C2 pulses is decreased correspondingly with the result that each sample of data extracted from the memory 80 of FIG. 1 is placed in the same position on the paper 54 as would have been the case had the stylus speed been unchanged. In this respect, it is noted that the knob 130 is typically set to provide for the sequential occurrence of the data samples at sequential positions along the path of the stylus 50 such that the array of the printed samples extends across the full width of the paper 54. However, if desired, the knob 130 may be turned to provide a higher speed of the clock 126 so that the array of the printed samples is compressed to appear over a fraction of the full width of the paper 54.

The counter 122 counts pulses provided by the switch 66, each of these pulses being provided upon a contacting of the switch 66 by the stylus 50 as it is transported around the pulleys 46 and 56. In this way, the count of the counter 122 represents the passage of time with the units of time being the passings of the stylus 50 past the switch 66. The counter 122 is reset to zero by the record signal at terminal B whereupon the counting is resumed. The source 132 is set for the instant of time when the transmit signal at terminal A is to be provided, the transmit time being measured in terms of the passings of the stylus 50 past the switch 66. Similarly, the record time is set by the source 134. When the count of the counter 122 is equal to the number provided by the source 132, the comparator 136 provides a pulse to terminal A, this pulse being the transmit signal. In like manner, when the count of the counter 122 is equal to the digital number of the source 134, the comparator 138 provides a pulse signal to terminal B, this signal being the record signal.

The operation of the timing signals is as follows. The pulses provided by the clock 72 of FIG. 1 occur at a rate sufficiently fast relative to the bandwidth of the receiver 34 such that several or more clock pulses are provided during the rise time of a signal provided by the receiver 34 to the comparator 70. The operation of the DAC 88 and the counter 76 are sufficiently fast such that the comparator 70 can make the aforementioned comparisons at the rate at which the clock pulses are provided by the clock 72.

The rate of occurrence of the write signals at terminal C1 is selected by the knob 128 of FIG. 2 such that N of these signals can occur during the round trip time of the sonar signal along the arrows 26 from the transmitting transducer 24 to the receiving transducer 30. For example, in the case where N is set equal to 400 by knob 139 in FIG. 1, then 400 marks are provided on the paper 54 of the recorder 38 during a single pass of the stylus 50. For shallow depths, the knob 128 is adjusted to provide a relatively high rate of occurrence of the C1 pulses so that 400 of these pulses can occur during the round trip time of the sonar signal along the arrows 26. For deep water, the knob 128 is adjusted to provide C1 pulses at a relatively slow rate so that 400 of these pulses occur during an interval of time approximating the aforementioned round trip time.

In the foregoing example wherein N was set equal to 400, the overall interval during which echoes from reflecting surfaces in the ocean 28 are observed by the data processor 36 is divided into 400 subintervals, the terminus of each subinterval being designated by the occurrence of a C1 pulse. The duration of each of the foregoing subintervals is very much longer than the reciprocal of the bandwidth of the receiver 34 so that many clock pulses from the clock 72 occur within each subinterval.

The digital number set in the source 134 is sufficiently large so that the difference in time represented by the numbers of the sources 134 and 132 is greater than the aforementioned interval of time during which data samples are being accumulated by the memory 80. For example, assuming that the recorder 38 has but one stylus 50 and that the stylus makes a complete pass around the paper 54 in one second, and furthermore assumming that the depth of the ocean 28 is such that a round trip time of 15 seconds occurs, then, the source 132 might be set, by way of example, to 5 seconds while the source 134 is set to 19 seconds. With the foregoing settings, the data sampling interval by the data processor 36 would begin at a time of 5 seconds and terminate at a time of 15 seconds at which time the flip-flop 108 is reset. The reading out of the data samples from the memory 80 and the printing of this data on the paper 54 would commence at the time of 19 seconds and terminate at approximately 19½ seconds, approximately one-half second elapsing during the passage of the stylus 50 from the switch 66 to the pulley 56. At the time of 19 seconds, the counter 122 is reset to 0 by the comparator 138. As the stylus 50 completes the foregoing passage around the paper 54 and returns to the switch 66, the counter 122 attains a count of 1.

In the event that the output of the memory is to be fed directly to a computing system (not shown), C2 pulses may be provided by the computing system to enable the stored data of the memory 80 to be read out at a faster rate commensurate with the operation of that computing system. Thus, it is seen that the system 20 provides for the entry of data into storage at one rate with the retrieval from storage being accomplished at a different rate.

Referring now of FIG. 3, there is seen a further embodiment of the invention in which a depth compensator 140 provides for the automatic setting of the speed, or pulse repetition frequency, of the clock 124 of FIG. 2 for different depths of the ocean 28. For example, four settings of the speed of the clock 124 may be automatically set corresponding to depths of 500, 1,000, 2,000 and 4,000 fathoms. The compensator 140 comprises a comparator 142 coupled to terminal J at the output of the counter 76 of FIG. 1, a threshold unit 144 which provides a preselected digital number, a shift register 146 coupled to terminal K of the counter 106 of FIG. 1, an averaging unit 148, a decoder 150 coupled to terminal L of the clock 124 of FIG. 2, an indicator 152 of the depth of the ocean 28, and lamps 154 indicating the depth setting of the clock 124.

In operation, the compensator 140 monitors the depth of the ocean 28, the count of the counter 76 serving as a measure of the amplitude of the echo signal received by the receiver 34, and the count of the counter 106 serving as a measure of the time elapsed since transmission of a sonar ping and, accordingly, a measure of the depth of a reflecting surface within the ocean 28. With reference to the foregoing example of 400 subintervals, the depth measurement is quantized to one part in 400 parts of the data sampling interval. The comparator 142 determines that an echo is present by comparing the count of the counter 76 with the digital number representing a threshold provided by the threshold unit 144. When the count of the counter 76 exceeds the threshold, the comparator 142 strobes the shift register 146 to store the count of the counter 106. The shift register 146 is a multiple stage shift register similar to that of the memory 80 of FIG. 1. Individual cells of the register are brought out on lines 156, individual ones of the lines 156 having successive values of the counts of the counter 106. The averaging unit 148 provides at its output on line 158 the average value of the digital numbers presented by the lines 156. The signal on line 158, apart from a scale factor, is equal to the average value of depth obtained over a number of previous depth measurements, for example, ten measurements in the situation wherein the shift register 146 has a length of ten cells. The averaging ensures that the signal on line 158 is free of sudden fluctuations as occur between measurements due to sea noise from the ocean 28. The decoder 150 is provided with four output lines 160 corresponding to the foregoing example of the four depths. The decoder 150 is responsive to two bits of the digital signal on line 158 for energizing one of the four lines 160, the two bits being the most significant bits of the digital numbers corresponding to the aforementioned ranges of 500, 1,000, 2,000 and 4,000 fathoms. The clock 124 contains a frequency divider circuit in the form of a counter (not shown in the figure) with individual stages being selectably addressable by the lines 160, and thus provides the pulse repetition frequency as ordered by the decoder 150. The lamps 154 are driven by the lines 160 to indicate the speed setting of the clock 124.

Referring again to FIG. 2, there is seen a further feature of the invention wherein the clock 124 is provided with a delay unit 162 coupled to the terminal C1 and having a knob 164 for adjusting the delay. With the delay set to zero, the system 20 of FIG. 1 operates as disclosed above. With a non-zero value of delay, the delay unit 162 delays the C1 write signal pulses so that the data entered into the memory 80 begins with a predetermined depth corresponding to the value of the delay. Additionally, setting the knob 128 for a relatively high rate of C1 pulses gives data samples for a relatively narrow extent of depth with the result that the display of the recorder 38 gives a magnified view of a reflecting surface within the ocean 28.

It is understood that the above described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. A recording system comprising:
   a recorder for recording data of a signal, said recorder having a recording medium and means for printing marks thereupon, there being a predetermined number of resolution elements across said medium for the printing of said marks;
   means synchronized to said printing means for initiating a data sampling interval and a data printing interval;

means coupled to said initiating means for repetitively sampling said signal during said data sampling interval to produce a series of samples, said sampling means including means for selecting one sample of said series of samples during each of a number of subintervals of said data sampling interval, said number of subintervals being equal to said predetermined number;

means for varying the duration of said data sampling interval while retaining said predetermined number of subintervals; and means synchronized to said printing means for feeding samples selected by said selecting means to said printing means during said data printing interval.

2. A system according to claim 1 wherein said data is the distance of a reflecting surface within a medium propagative of radiant energy, said system further comprising means coupled to said initiating means for transmitting a radiant energy signal toward said reflecting surface at the beginning of said data sampling interval and means coupled to said sampling means for receiving a radiant energy signal reflected by said reflecting surface.

3. A system according to claim 1 wherein said sampling means includes means for counting said subintervals, said counting means terminating said data sampling interval upon obtaining a count equal to said predetermined number.

4. A system according to claim 3 wherein said sampling means includes means for measuring a characteristic of said signal during each of said subintervals.

5. A system according to claim 4 wherein said characteristic is a peak value of said signal occurring during one of said subintervals.

6. A system according to claim 5 wherein said characteristic measuring means comprises a counter and a digital-to-analog converter responsive to a count of said counter for providing a reference signal, said counter retaining a value of count when said reference exceeds said signal, said retained value of count serving as said signal sample, said sampling means including means for transferring said retained value of count to said storing means.

7. In combination:

means for repetitively signaling the start of an interval for sampling a signal;

means coupled to said signaling means for measuring the amplitudes of signal occurring during said sampling interval to provide measures of amplitude;

means for resetting said amplitude measuring means periodically a predetermined number of times during said sampling interval;

means synchronized to said resetting means for storing said predetermined number of said amplitude measures;

means for recording said predetermined number of amplitude measures during a recording interval; and means coupled between said storing means and said recording means for activating said storing means to store sequential ones of said amplitude measures during sequentially occurring storing intervals, the length of one of said storing intervals being proportional to the length of said recording interval.

* * * * *